May 30, 1939.  F. CAVUOTI  2,160,538
CAMERA TRIPOD BRACE
Filed Feb. 8, 1938  2 Sheets-Sheet 1
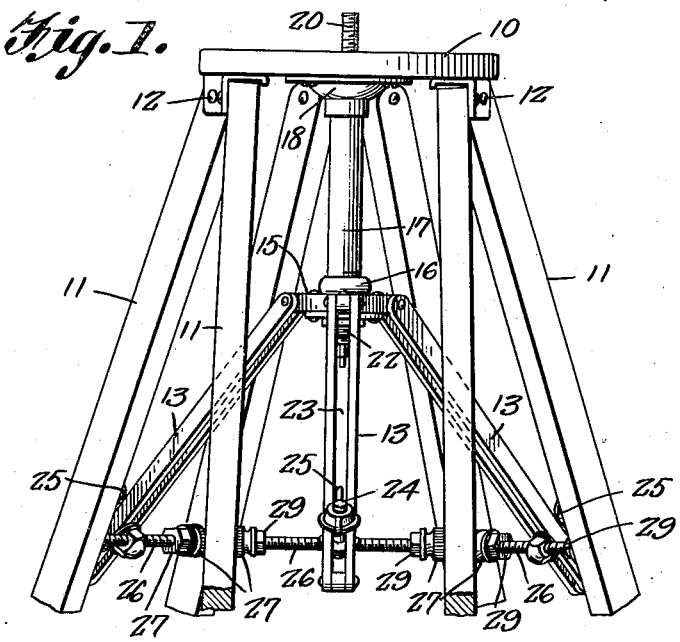
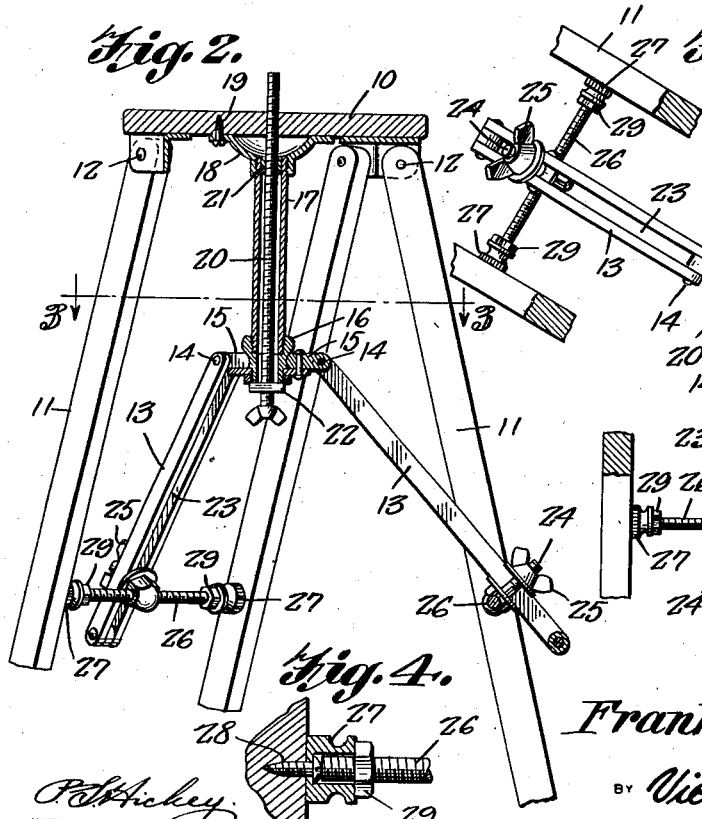
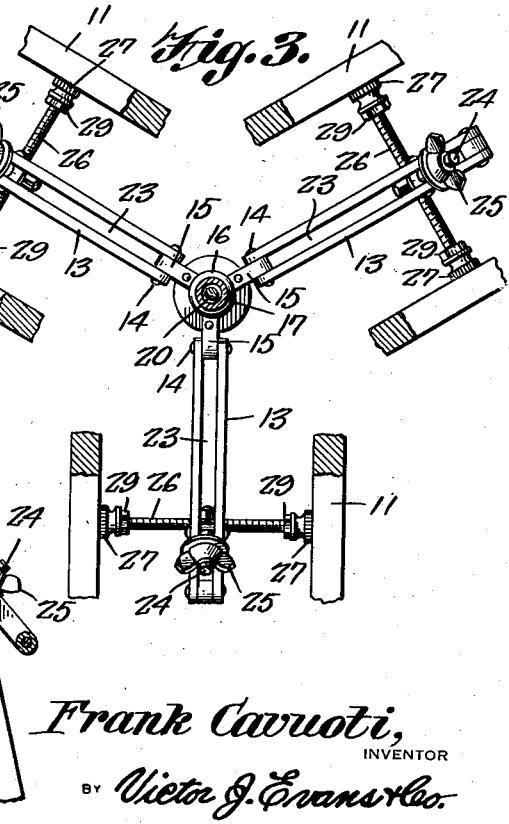
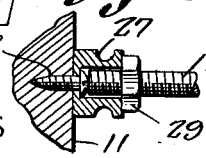
Frank Cavuoti, INVENTOR
BY Victor J. Evans & Co.
ATTORNEYS

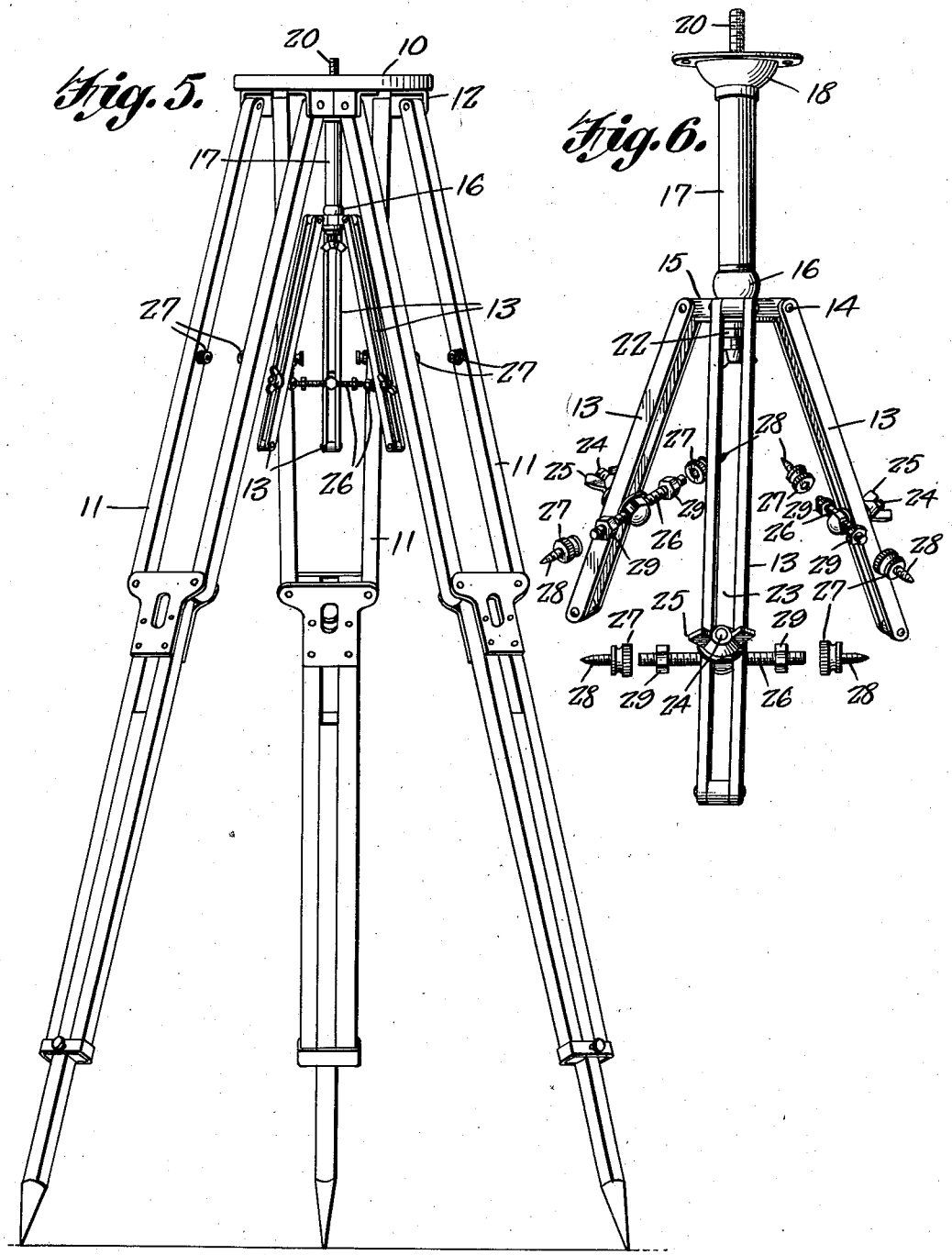

Patented May 30, 1939

2,160,538

UNITED STATES PATENT OFFICE 2,160,538

CAMERA TRIPOD BRACE

Frank Cavuoti, Richmond Hill, N. Y.

Application February 8, 1938, Serial No. 189,404

3 Claims. (Cl. 248—192)

This invention relates to camera tripod braces and has for an object to provide a detachable device for supporting the legs of a tripod in various adjusted positions and preventing tipping over of the tripod when in use.

A further object of the invention is to provide a tripod brace which may be quickly applied to any tripod and which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a camera tripod equipped with a tripod brace constructed in accordance with the invention.

Figure 2 is a longitudinal sectional view of the tripod and tripod brace.

Figure 3 is a cross sectional view taken on the line 3—3 of Figure 2 showing the brace applied to the tripod legs.

Figure 4 is a detail sectional view showing the socket and end of one of the rods of the brace.

Figure 5 is a side elevation of a camera tripod and showing the brace partly assembled with the tripod.

Figure 6 is a side elevation of the brace detached from the tripod.

Referring now to the drawings in which like characters of reference designate similar parts in the various views, 10 designates a camera support having legs 11 pivotally connected to the bottom thereof as shown at 12, each leg being formed of two bars as is conventional.

In carrying out the invention a plurality of brace sections 13, one for each leg, are pivotally connected at the upper ends as shown at 14 to respective arms 15 of a spider 16. The spider is attached to the lower end of a tube 17 the upper end of which is equipped with a flared head 18 which is screwed as shown at 19 to the bottom face of the camera support 10.

A screw 20 is mounted in the bore of the tube 17 and is threadedly engaged with a nut 21 loose in the upper end of the bore of the tube. The screw is threadedly engaged at the lower end with a collar 22 of the spider at the bottom of the tube. The purpose of the screw is to secure the camera to the support 10. The purpose of the collar 22 is to regulate the amount of thread needed to fasten the camera.

Each of the brace sections 13 is provided with a longitudinal slot 23 and a bolt 24 equipped with a wing nut 25 is slidably mounted in the slot. The head of the bolt is located at the lower side of the brace section and rods 26 are threadedly engaged with the head and project in alignment on opposite sides of the head.

As best shown in Figure 4, the rods 26 carried by each brace section 13 have their ends received in socket members 27 which are secured in the inner faces of the two bars of each leg 11 by screws 28 or other connectors. A lock nut 29 is threadedly engaged on the end of each rod to lock the rod to the socket.

In operation the bolts 24 may be adjusted to any desired position longitudinally of the brace section to control the spread of the legs when the tripod is set up. The brace sections 13, bolts 24 and rods 26 provide a strong rigid brace to prevent tipping over of the tripod and to hold the tripod firmly set up in any desired adjusted position.

From the above description it is thought that the construction and operation of the invention will be fully understood without further explanation.

What is claimed is:

1. A brace for a tripod comprising a tube adapted to be secured to the tripod support, a spider carried by the lower end of the tube, brace sections pivoted at the upper ends to the spider and each having a longitudinal slot, a bolt passed through each slot having a head and a nut disposed on opposite sides of the brace sections, rods threadedly engaged with the bolt head and projecting in alignment on opposite sides of the bolt head, socket members adapted to be secured to the legs of a tripod and being adapted to receive the ends of the rods, and nuts on the rods for abutting said socket members and locking the brace sections in adjusted positions.

2. A brace for a tripod comprising a tube adapted to be secured to a tripod support, a spider carried by the lower end of the tube, brace sections pivoted at the upper ends to the spider and each having a longitudinal slot, a bolt passed through the slot of each brace section and having a head and a wing nut, the head being disposed on the underneath side of the brace section, rods carried by each bolt head extending on opposite sides thereof transversely of the respective section, and means for adjustably securing the ends of the rods to the legs of a tripod for controlling the spread of the brace sections.

3. A brace for a camera tripod having a camera support and legs each formed of two longitudinal members, comprising a tube adapted to be secured at the upper ends to said supoprt, brace sections pivoted at the upper ends to the lower end of the tube and each having a longitudinal slot, a bolt adjustably mounted in the slot of each brace section, threaded rods carried by each bolt extending in opposite directions from the bolt to said longitudinal members of the respective leg, socket members adapted to be secured to said longitudinal members of each leg, said rods being adapted to be received endwise in said socket members, and nuts on said rods adapted to be screwed tight against said socket members to removably secure said rods to the socket members.

FRANK CAVUOTI.